Sept. 29, 1942.  G. A. GARRETT ET AL  2,296,917
WATER TEMPERATURE REGULATING DEVICE
Filed Oct. 25, 1941
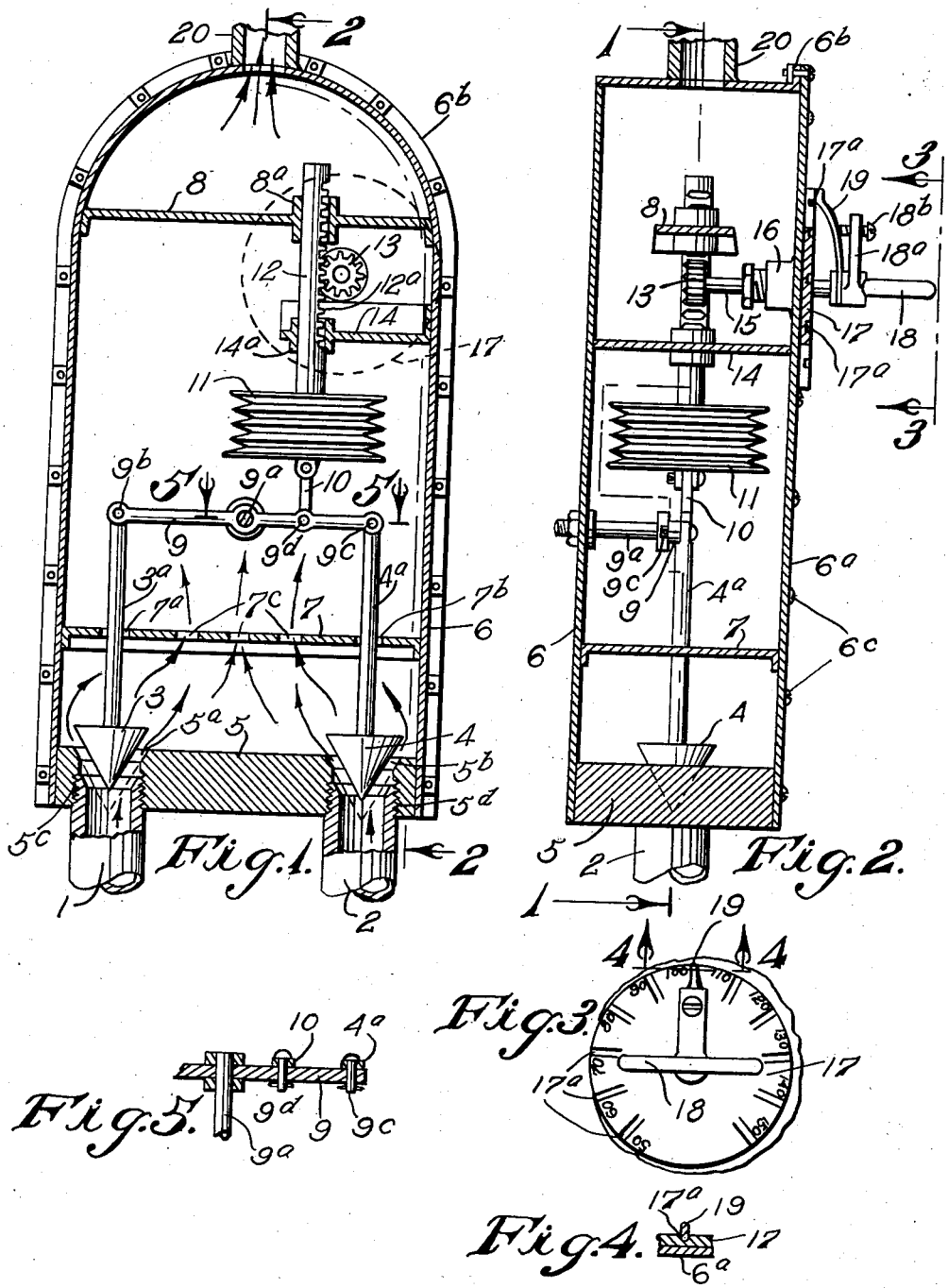
INVENTORS.
Gervo A. Garrett
and Emil Garrett
BY A. B. Bowman
ATTORNEY Patented Sept. 29, 1942

2,296,917

UNITED STATES PATENT OFFICE 2,296,917

WATER TEMPERATURE REGULATING DEVICE

Gerva A. Garrett and Emil Garrett, Pacific Beach, Calif.

Application October 25, 1941, Serial No. 416,516

2 Claims. (Cl. 236—12)

Our invention relates to a device for regulating the temperature of water in preparation for showers, baths, or the like, and the objects of our invention are:

First, to provide a very simple thermostatically controlled valve means for regulating water taken from the hot and cold water supply;

Second, to provide a device of this class in which a thermostat is adjusted to provide a particular thermal heat to the mixed water as it passes to the outlet from the device;

Third, to provide a device of this class in which the temperature regulator is very positive and is not easily disturbed or moved out of its position;

Fourth, to provide a device of this class in which the water is thoroughly mixed together immediately after it passes from the hot water inlet and cold water inlet into the device so that it is thoroughly mixed when it reaches the thermostat for controlling the valve at the inlet and outlet of the device;

Fifth, to provide a device of this class which is positive in its action throughout;

Sixth, to provide a device of this class which is very simple and economical of construction, efficient in its action and which will not readily deteriorate or get out of order.

With these and other objects in view as will appear hereinafter, our invention consists of certain novel features of construction, combination and arragement of parts and portions as will be hereinafter described in detail and particularly set forth in the appended claims, reference being had to the accompanying drawing and to the characters of reference thereon which form a part of this application in which:

Figure 1 is a longitudinal sectional view of our device for regulating water taken from the line 1—1 of Fig. 2 showing parts and portions in elevation to facilitate the illustration; Fig. 2 is a sectional view taken from the line 2—2 of Fig. 1 showing parts and portions in elevation to facilitate the illustration; Fig. 3 is a fragmentary side elevational view taken from the line 3—3 of Fig. 2; Fig. 4 is a fragmentary sectional view taken from the line 4—4 of Fig. 3 and Fig. 5 is a fragmentary sectional view taken from the line 5—5 of Fig. 1 showing parts and portions in elevation to facilitate the illustration.

Similar characters of reference refer to similar parts and portions throughout the several views of the drawing:

The cold water inlet pipe 1, hot water inlet pipe 2, cold water inlet valve 3, hot water inlet valve 4, base member 5, main casing 6, mixing plate 7, support 8, rocker arm 9, link member 10, thermostat 11, rack shaft 12, pinion 13, support 14, shaft 15, stuffing box 16, index plate 17, handle 18, friction spring 19 and water outlet 20 constitute the principal parts and portions of our water regulating device.

The water inlet pipes 1 and 2 are screw-threaded into the base member 5 in spaced relation to each other at its lower side, as shown best in Fig. 1 of the drawing. This base member 5 is provided with tapered seat portions 5a and 5b in the upper side in intercommunicating relation with the inlet pipes 1 and 2, as shown best in Fig. 1 of the drawing. This base member 5 is rectangular in shape and secured to one side thereof and along the ends is the main casing member 6 which extends upwardly and is provided with a curved upper end, as shown best in Fig. 1 of the drawing. Secured on one side is a plate 6a which is shaped to fit against the other side wall of the base member 5 and open side of the casing member 6 and is secured thereto by means of bolts 6c which are screw-threaded into a flange 6b on the main casing 6, thus providing a rectangular in cross section casing member extending upward from this base member 5 and provided with a curved upper end, thus providing a water-tight casing.

Secured in the inner part of the curved upper end is the outlet pipe 20 which communicates with an opening in the upper end of said casing.

Positioned in this casing 6 some distance above the base member 5 is a mixing plate 7 which is provided with a plurality of mixing orifices 7c and with valve guide openings 7a and 7b which also serve as mixing orifices. Positioned in the opening 7a and 7b are valve rods 3a and 4a respectively. On the lower end of the valve rod 3a is secured the cone-shaped valve member 3 which is adapted to fit in the valve seat 5a in the member 5 and secured on the lower end of the valve rod 4a is a cone-shaped valve 4 which is adapted to fit in the valve seat 5b in the base member 5. These valve rods 3a and 4a are pivotally supported on the extended end of the rocker arm 9 which is pivoted centrally on a shaft 9a which is secured in the side wall of the casing 6, as shown best in Fig. 2 of the drawing. The valve rods 3a and 4a are connected to the rocker arm 9 by means of pivoted members 9b and 9c.

Between the shaft 9a and the pivot member 9c is another shaft 9d to which is pivotally connected the link members 10 at its lower end. This link member is connected at its upper end to a thermostat member 11. Secured centrally on this thermostat member 11 at its upper side and extending upwardly is a rack shaft 12 which is provided with gear teeth 12a which are adapted to mesh with a pinion 13 mounted on a shaft 15 which extends through a stuffing box 16 secured on the casing member 6a so that upon revolution of the shaft 15, the pin 13 will be revolved shifting the rack shaft 12 upwardly or downwardly depending upon the revoluble movement of the pinion 13. This shaft is supported near its lower end by means of a support 14 with a bearing 14a in which the shaft 12 is mounted and at the upper end is provided a bearing 8a in which the upper end of the shaft 12 is mounted which bearing 8a is supported by means of a support 8 which is secured to the opposite side of the casing 6 near its upper end, as shown best in Fig. 1 of the drawing.

Secured on the outer side of the casing member 6a around the shaft 15 is an index plate 17, as shown best in Figs. 2 and 3 of the drawing. This index plate 17 is provided with a plurality of index characters at its periphery and is also provided with a plurality of slots 17a extending from its periphery inwardly a short distance adapted to receive the end of the spring member 19 to provide a positive support for the end of the spring member 19 which prevents the shaft from turning when it is not forced around by the handle 18 which is secured on the end of the shaft. Supported on this handle 18 is an arm member 18a in the extended end of which is a screw 18b which serves as an adjusting screw to engage the spring 19 for adjusting it in frictional relation with the notches 17a in the index plate 17.

The operation of our water regulating device is substantially as follows:

Hot and cold water passes through the hot and cold water pipes 1 and 2 past the valves 3 and 4 and is mixed thoroughly by passing through the orifices 7c and around the valve rods 3a and 4a through the openings 7a and 7b and passes out through the outlet pipe 20 at the upper end. The thermostat 11 is regulated by turning the handle 18 to certain temperature positions as indicated by the end of the spring 19 relative to the notches 17a which are numbered at the periphery of the index plate 17, as shown best in Fig. 3 of the drawing. If the temperature of the water passing through the orifices 7c is not the proper temperature the thermostat 11 will tend to raise or lower the one end of the rocker arm 9 which will cause the valve 3 or 4 to be raised or lowered accordingly thus regulating the flow of hot or cold water into the opening below the mixing plate 7, thus determining the temperatures of water passing through the outlet pipe 20.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a water regulating device of the class described, the combination of a casing provided with a base member, hot and cold water inlets connected with said base member at opposite sides of said casing and communicating with the interior of said casing, a cone-shaped hot water valve in connection with one of said inlets, a cone-shaped cold water valve in connection with the other of said inlets, a horizontally disposed mixing plate in said casing above said valves provided with a plurality of orifices through which the hot and cold water passes and is mixed thereby, a rocker arm pivotally mounted above said mixing plate, rods pivotally connected at the opposite ends of said rocker arm with said valve, means for pivotally supporting said rocker arm intermediate its end, and a thermostat pivotally connected with said rocker arm between one end of said rocker arm and its pivotal support.

2. In a water regulating device of the class described, the combination of a casing provided with a base member, hot and cold water inlets connected with said base member at opposite sides of said casing and communicating with the interior of said casing, a cone-shaped hot water valve in connection with one of said inlets, a cone-shaped cold water valve in connection with the other of said inlets, a horizontally disposed mixing plate in said casing above said valves provided with a plurality of orifices through which the hot and cold water passes and is mixed thereby, a rocker arm pivotally mounted above said mixing plate, rods pivotally connected at the opposite ends of said rocker arm with said valve, means for pivotally supporting said rocker arm intermediate its ends, a thermostat pivotally connected with said rocker arm between one end of said rocker arm and its pivotal support, a shaft secured to said thermostat at its upper side provided with a gear rack along one side thereof, means for supporting said shaft for reciprocal movement, a pinion intermeshing with said gear rack, a shaft for supporting said pinion extending through the wall of said casing, handle means for revolving said shaft at the outside of said casing, an indicator dial secured on said casing around said shaft, means in connection with said shaft and said handle for engagement with said dial and means for adjusting the friction of said means relatively to said dial.

GERVA A. GARRETT.
EMIL GARRETT.